(12) United States Patent
Khieu

(10) Patent No.: US 7,843,316 B1
(45) Date of Patent: Nov. 30, 2010

(54) POWER-ON RESET APPARATUS, SYSTEMS, AND METHODS

(75) Inventor: Cong Khieu, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 765 days.

(21) Appl. No.: 11/842,862

(22) Filed: Aug. 21, 2007

Related U.S. Application Data

(60) Provisional application No. 60/918,811, filed on Mar. 19, 2007.

(51) Int. Cl.
*H04Q 5/22* (2006.01)
(52) U.S. Cl. .................................................. 340/10.1
(58) Field of Classification Search .............. 340/10.1
See application file for complete search history.

(56) References Cited

U.S. PATENT DOCUMENTS

| | | | |
|---|---|---|---|
| 6,791,394 B2* | 9/2004 | Deboes et al. | 327/536 |
| 6,980,084 B1* | 12/2005 | Yones | 340/10.34 |
| 7,321,290 B2* | 1/2008 | Stevens et al. | 340/10.1 |
| 7,423,517 B2* | 9/2008 | Kofler | 340/10.51 |
| 2002/0109535 A1* | 8/2002 | Caliboso | 327/143 |
| 2004/0036626 A1* | 2/2004 | Chan et al. | 340/870.17 |
| 2004/0130299 A1* | 7/2004 | Pietkiewicz et al. | 320/166 |
| 2005/0162144 A1* | 7/2005 | Kernahan | 323/300 |
| 2006/0208777 A1* | 9/2006 | Ichikawa et al. | 327/142 |
| 2006/0279970 A1* | 12/2006 | Kernahan | 363/65 |
| 2007/0096875 A1* | 5/2007 | Waterhouse et al. | 340/10.1 |
| 2007/0170961 A1* | 7/2007 | Liao et al. | 327/143 |
| 2008/0238630 A1* | 10/2008 | Chen et al. | 340/10.5 |

* cited by examiner

*Primary Examiner*—George A Bugg
*Assistant Examiner*—Naomi Small
(74) *Attorney, Agent, or Firm*—Nixon Peabody LLP; David B. Ritchie

(57) ABSTRACT

Apparatus, systems, and methods may include providing a power-on reset function to many types of receiving circuitry, including processors, memories, and radio frequency identification (RFID) tag processing circuitry. Thus, the power-on reset function may be realized by applying a supply voltage to a power-on reset circuit coupled to the processing circuit of an RFID tag. Additional activity may include sensing a first current substantially independent of the supply voltage, sensing a second current substantially dependent on the supply voltage, and indicating a power-on reset condition based on a comparison between the first current and the second current. Additional apparatus, systems, and methods are disclosed.

16 Claims, 5 Drawing Sheets

POWER-ON RESET CIRCUIT

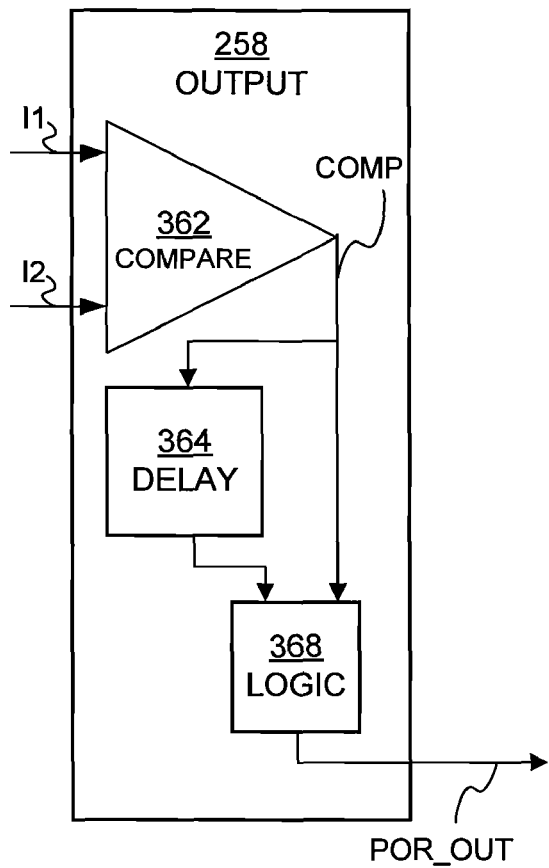
FIG. 3  *OUTPUT CIRCUIT*
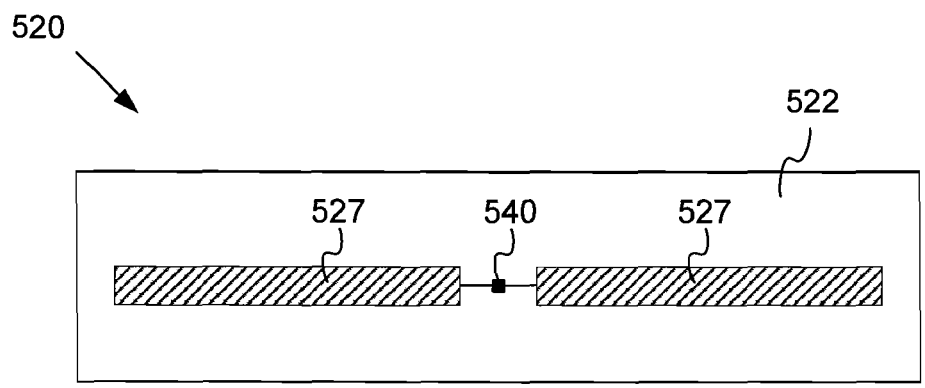
FIG. 5  *RFID TAG*

POWER-ON RESET APPARATUS, SYSTEMS, AND METHODS

PRIORITY CLAIMS

This disclosure claims the benefit of the filing date of U.S. Provisional Patent Application Ser. No. 60/918,811, filed on Mar. 19, 2007, and titled "Power-On Reset Circuit Without Positive Feedback." It is commonly assigned to the assignee of the instant application, Impinj, Inc., and incorporated herein by reference in its entirety.

TECHNICAL FIELD

The information in this document is related to electronic circuit power management mechanisms, including apparatus, systems, and methods that operate to manage the operation of electronic circuitry as it transitions from an un-powered state to a powered state.

BACKGROUND INFORMATION

Power-on reset circuitry is typically employed as an adjunct to other circuits, such as memories and processors. In principle, power-on reset circuitry operates to provide a repeatable starting point for larger circuit operations as power is applied and the circuit receiving an indication from the power-on reset circuit moves from an un-powered state to a fully-powered state. Typically, the power-on reset circuit indicates to the receiving circuit (e.g., a memory programming circuit) that the power supply voltage has risen to a level sufficient to conduct normal operations.

Some power-on reset circuits employ positive feedback. Such circuit implementations may use multiple, stacked diodes to set the triggering voltage high enough for their particular application. This design can suffer from trapped charge among the diodes, preventing the complete turn-off of other components in the reset circuit. Receiving circuit operation may be less reliable as a result.

BRIEF DESCRIPTION OF THE DRAWINGS

FIG. 3 is a block diagram of an output circuit, forming a portion of a power-on reset circuit according to various embodiments of the invention.

FIG. 5 is a top view of the components of a Radio Frequency IDentification (RFID) tag, including a tag that can be used in conjunction with the circuit of FIG. 2, according to various embodiments of the invention.

DETAILED DESCRIPTION

Figure 1:
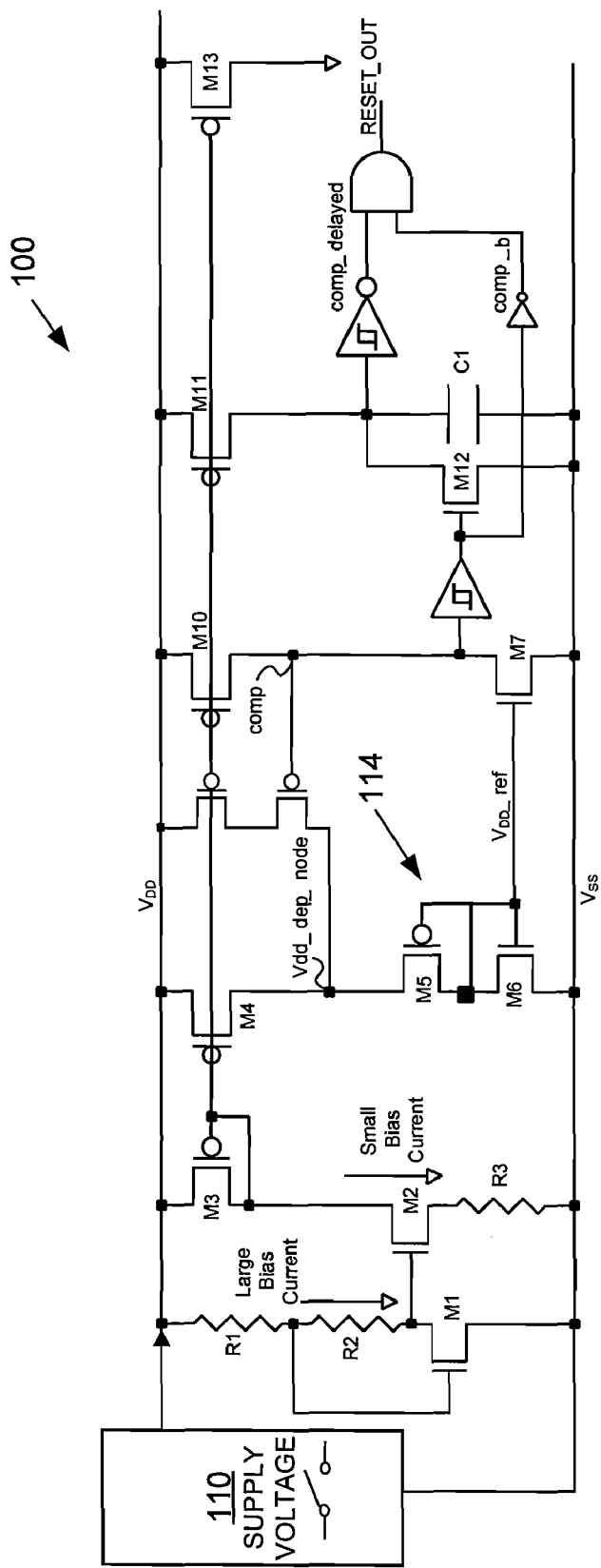
FIG. 1 is a prior art schematic diagram of a power-on reset circuit.

FIG. 1 is a prior art schematic diagram of a power-on reset circuit 100. The circuit 100 provides a pulse RESET_OUT to indicate that the supply voltage $V_{DD}$ is sufficiently high to accomplish whatever functions are desired by the designer of the circuitry receiving this pulse signal. The pulse RESET_OUT in turn, is generated using the ANDed combination of the comparison signal comp_b and delayed comparison signal comp_delayed, which are both derived from a comparison of the currents through transistors M7 and M10, resolved at the node comp.

In this case, the transistors M5 and M6 operate as a stacked diode pair 114, so that the supply voltage $V_{DD}$ generally must rise to a level that provides a voltage equivalent to two diode junction voltage drops at the node Vdd_dep_node, which permits a sufficient amount of current to flow through the transistors M5 and M6 for proper operation. Thus, even when transistor M8 is turned off, the current through transistor M4 is very small when low levels of the supply voltage $V_{DD}$ are present, so that the current through transistor M7 is also small (since transistor M7 functions as a current mirror of transistor M6), and the node comp is supposed to be held at a logic HIGH level. However, at low levels of the supply voltage $V_{DD}$, positive feedback is lost (until the voltage level at node Vdd_dep_node is sufficiently high), the current through transistor M7 is approximately equal to the current through transistor M10, the value of the voltage at the node comp is indeterminate, because the transistor M7 is not completely turned off. In other words, the comparison between the currents flowing between transistor M7 and M10, as resolved at the node comp, and which ultimately provides an indication of the state of the voltage $V_{DD}$ provided by the power supply 110 in the form of the signal pulse RESET_OUT, does not operate properly at low $V_{DD}$ voltage supply levels. This occurs because the value of each of the currents through transistors M7 and M10 substantially depends on the value of the power supply voltage $V_{DD}$.

Figure 2:
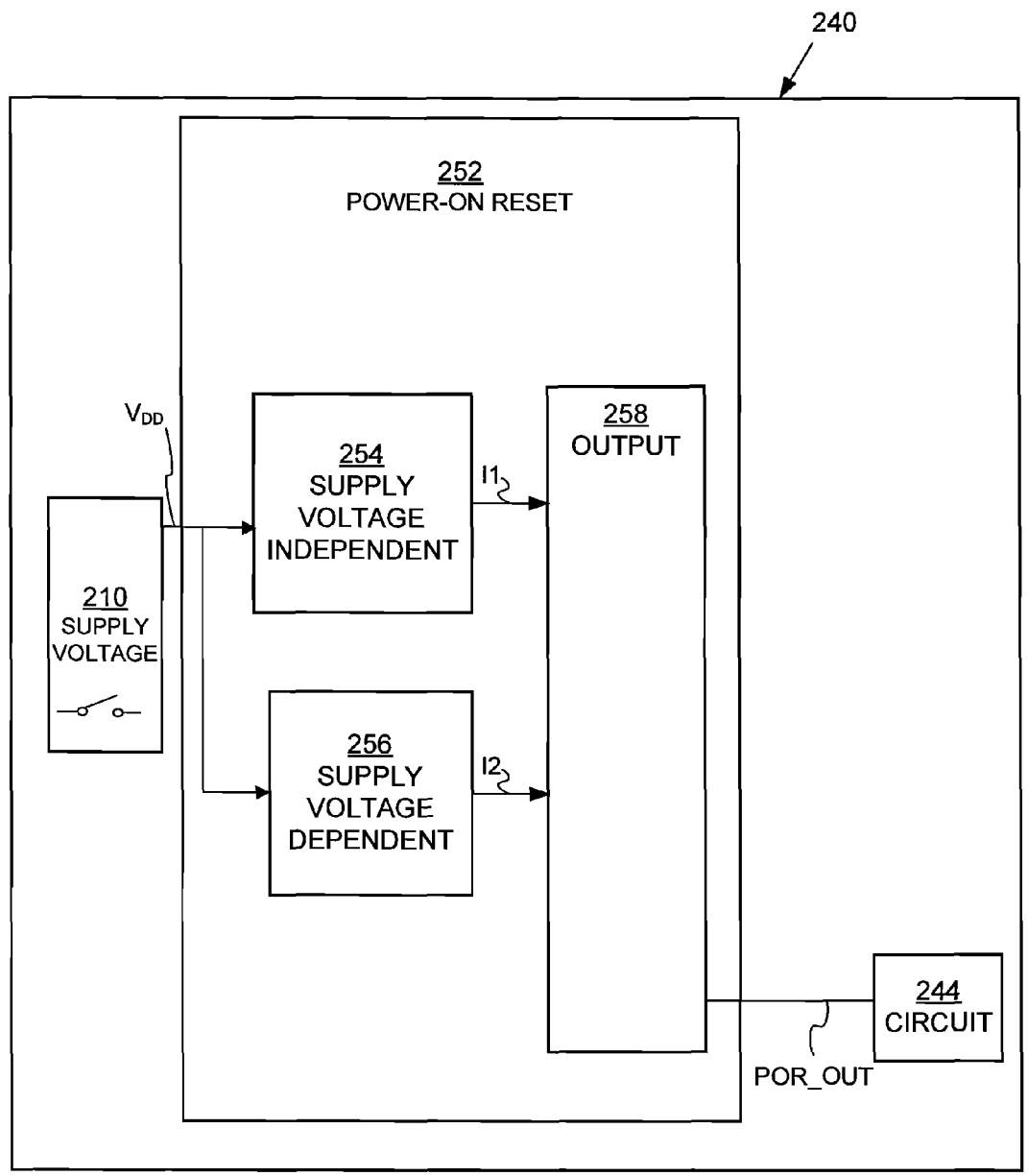
FIG. 2 is a block diagram of a power-on reset circuit coupled to a receiving circuit according to various embodiments of the invention.

FIG. 2 is a block diagram of a power-on reset circuit 252 coupled to a receiving circuit 244 according to various embodiments of the invention. Here, the challenges noted above are addressed by using circuitry that does not rely on positive feedback. Instead, one of the currents used to determine the state of the power supply voltage $V_{DD}$ provided by the power supply 210 is made to be substantially independent of the $V_{DD}$ voltage level.

This design is more easily portable because trapped charge, which can render an unpredictable result in the power-on reset triggering circuitry when the technology or foundry are changed, is eliminated. The design is also more easily scaled to work at lower supply voltages, since there is no diode pair in the triggering circuitry. That is, this design is portable and scalable to different and more advanced technologies, since the power-on reset triggering circuit eliminates trapped charge effects, and the triggering circuit voltage can be scaled down along with the supply voltage $V_{DD}$. Increased operational reliability at low levels of the supply voltage $V_{DD}$ can thus be realized with respect to the receiving circuit 244.

In some embodiments, an integrated circuit 240 may be fabricated to include one or more of the power-on reset circuit 252, the receiving circuit 244, and/or the power supply 210.

In FIG. 2, it can be seen that the power supply voltage $V_{DD}$ is supplied by the power supply 210 to the power-on reset circuit 252. The voltage is received by an independent current circuit 254 and a dependent current circuit 256, providing currents $I_1$ and $I_2$. Here, the magnitude of current $I_1$ provided by the independent current circuit 254 is substantially independent of the level of voltage $V_{DD}$, while the magnitude of the current $I_2$ provided by the dependent current circuit 256 is substantially dependent on the level of the voltage $V_{DD}$.

The respective magnitudes of the currents $I_1$ and $I_2$ are processed by the output circuit 258, so that, for example, when the value of the current $I_2$ has increased sufficiently to be greater than that of current $I_1$, a power-on reset indication, in the form of the signal POR_OUT, is provided to the receiving circuit 244. In some embodiments, the output circuit 258 may indicate a power-on reset condition when the value of the two currents are substantially equal. The receiving circuit 244 may comprise a memory, a processor, a data acquisition system, a memory programming circuit, a radio frequency identification circuit, and others.

FIG. 3 is a block diagram of an output circuit 258, forming a portion of a power-on reset circuit (e.g., power-on reset circuit 252 of FIG. 2) according to various embodiments of the invention. Here it can be seen that the output circuit 258 may comprise a comparator 362 that operates to compare the magnitudes of currents $I_1$ and $I_2$. The comparison result COMP (e.g., a logic value indicating that current $I_2 > I_1$) is presented to indication logic 368 directly, and via delay circuit 364. Thus, when the comparison result COMP between currents $I_1$ and $I_2$ is presented in a derived form by the output circuit 258, the resulting power-on reset indication POR_OUT may take the form of a pulse that indicates the supply voltage (e.g., supply voltage $V_{DD}$ supplied by the supply 210 of FIG. 2) is sufficient to conduct regular circuit operations within the receiving circuit 244 (also shown in FIG. 2).

Referring now to FIGS. 2 and 3, it can be seen that some embodiments of the invention may be realized as an integrated circuit chip 240. The integrated circuit chip 240 may comprise an independent current circuit 254 to provide a current $I_1$ substantially independent of the supply voltage $V_{DD}$, and a dependent current circuit 256 to provide a current $I_2$ substantially dependent on the supply voltage $V_{DD}$. The integrated circuit chip 240 may also comprise an output circuit 258 to provide a power-on reset indication POR_OUT based on a comparison between the current $I_1$ (substantially dependent on the supply voltage $V_{DD}$) and the current $I_2$) substantially independent of the supply voltage $V_{DD}$).

Figure 4:
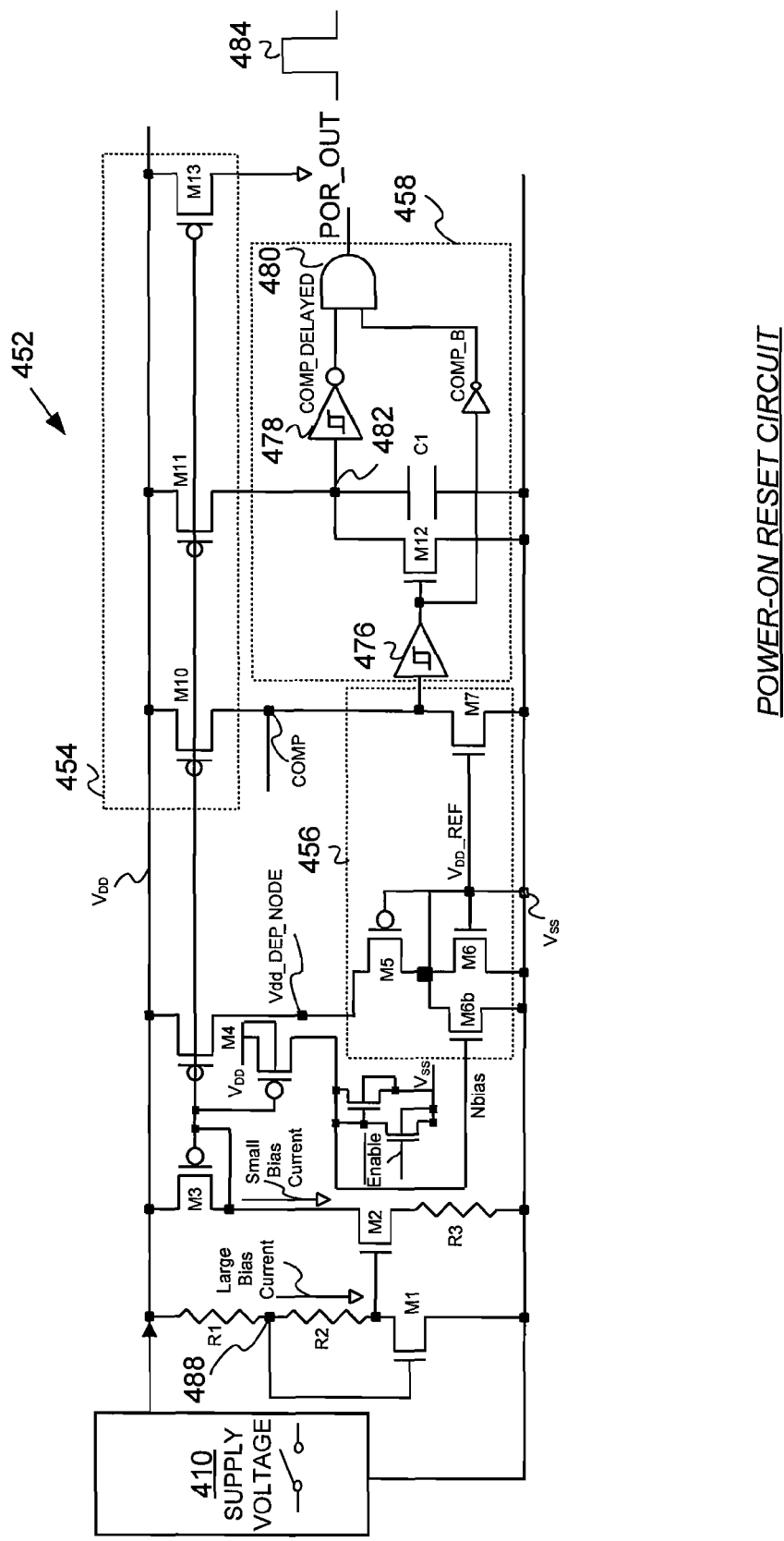
FIG. 4 is a schematic diagram of a power-on reset circuit according to various embodiments of the invention.

FIG. 4 is a schematic diagram of a power-on reset circuit 452 according to various embodiments of the invention. Here, it can be seen that some embodiments of the invention may include changing the circuit of FIG. 1 so that the pair of stacked diodes 114 shown in FIG. 1 are replaced with components and connections that essentially operate as a diode and a resistor, permitting one of the currents used to determine the state of the power supply voltage $V_{DD}$ to be substantially independent of the $V_{DD}$ voltage level. Charge trapping between multiple diodes is eliminated as a result, and increased receiving circuit operational reliability at low levels of the voltage $V_{DD}$ may be realized. This new design can operate over a wider range of the supply voltage $V_{DD}$, since the power-on reset trigger point can be scaled as the supply voltage $V_{DD}$ is scaled. Previous designs do not scale in this fashion, due to multiple diode drops.

In FIG. 4, transistor M10 operates to pass a $V_{DD}$-independent current to the node COMP. Transistor M7 operate s to pass a $V_{DD}$-dependent current to this same node. Thus, when power is applied to the circuit 452 by the supply 410, the combination of resistors R1 and R2, and transistor M1, begins to operate. Transistor M1 operates in the sub-threshold current region when the voltage $V_{DD}$ is about 0.1-0.3 volts, and the large bias current passed by transistor M1 comprises substantially $V_{DD}$-independent current. While in theory, as the magnitude of $V_{DD}$ increases, the current through transistor M1 should increase, the reality is that when transistor M1 operates in the sub-threshold region, the voltage at the node 488 between resistors R1 and R2 is very low. So as $V_{DD}$ increases, the voltage drop across resistor R2 increases. This turns on transistor M1 more strongly, so that transistor M1 in turn attempts to pull the node 488 to a lower voltage. Thus, quasi-negative feedback operates at the node 488 to make the large bias current through transistor M1 substantially independent of the magnitude of $V_{DD}$. In this way, it can be seen that transistor M1 works as a voltage-controlled variable resistor. When the supply voltage $V_{DD}$ increases, the voltage at node 488 rises, decreasing the resistance of transistor M1. The size of transistor M1 can be chosen so its resistance adjusts at the same rate as the change in the supply voltage $V_{DD}$, and the current through transistor M1 will therefore be substantially independent of changes in the supply voltage $V_{DD}$.

Due to using this mode of operation, which was not possible with the circuit of FIG. 1, the current through transistor M10 will also be substantially independent of the magnitude of the voltage $V_{DD}$. This is because, instead of two diode drops across transistors M5 and M6 (see the diode pair 114 of FIG. 1), there is only one diode operating, as realized by transistor M6. Transistor M5 now essentially operates as a resistor having a value that depends on the magnitude of $V_{DD}$.

When the value of $V_{DD}$ is low, transistor M5 will be turned off. For example, if the magnitude of $V_{DD}$ is about 0.3 volts, transistor M5 won't turn on, and there is no voltage drop across transistor M6, due to the operation of transistor M6b, which eliminates trapped charge. This means that transistor M7 will be turned off. But as the magnitude of the supply voltage $V_{DD}$ increases, the magnitude of the voltage $V_{DD\_REF}$ also increases, so that transistor M7 will turn on, and the current through transistor M7 will eventually be larger than the substantially $V_{DD}$-independent current flowing through transistor M10.

In some embodiments, the size of transistor M4 is designed to be about three to about ten times larger than transistor M10, so that the maximum current through transistor M7 is similarly about 3-10 times larger than that flowing through transistor M10. Thus, when the current through M7 eventually overrides the current through M10, the node COMP is brought down to a logic LOW level, indicating that the supply voltage $V_{DD}$ is at a level sufficient to operate the receiving circuitry coupled to the power-on reset circuit 452.

When power from the supply 410 is first applied to the circuit 452, the node COMP is at a logic HIGH level, which means the gate of transistor M12 is also at a HIGH level. This sets the node 482 between transistor M11 and capacitor C1 to a logic LOW level, preventing transistor M11 from charging capacitor C1 until transistor M12 is released, or turned off.

Transistor M12 is designed to pass a larger current than transistor M11, so that it can override the output of transistor M11. When the node COMP is at a logic LOW level, meaning the current through transistor M7 has become greater than the current flowing through transistor M10, then transistor M12 is released by the activity of the Schmitt trigger 476, so that the gate of transistor M12 goes to a logic LOW level, and transistor M12 is turned off Transistor M11 is then permitted to charge capacitor C1. When there is sufficient voltage on capacitor C1, then the Schmitt trigger 478 changes state. By this time, the comparison signal COMP_B has arrived at the AND gate, since the capacitor C1 may take several microseconds to charge, while the delay through the Schmitt trigger 478 is only about one nanosecond. Thus, the rising edge of the pulse 484 indicating a power-on reset signal POR_OUT is formed when the comparison signal COMP_B arrives at the AND gate 480, and the falling edge of the pulse 484 is formed when the comparison signal COMP_DELAYED arrives at the AND gate 480.

The elements 252, 254, 256, and 258 shown in FIG. 2 may be constructed according to the schematic diagram elements 452, 454, 456, and 458, respectively, shown in FIG. 4. Those of ordinary skill in the art will realize that additional elements, or different elements, may be used in the schematic diagram of FIG. 4, and that such elements have not been included herein to prevent obscuring the details of some embodiments of the invention illustrated in FIG. 4.

Thus, many embodiments may be realized. For example, referring now to FIGS. 2-4, it can be seen that an integrated circuit chip 240 that is fabricated to comprise an independent current circuit 454, a dependent current circuit 456, and an output circuit 458 may include an independent current circuit 454 that comprises one or more transistors M10 coupled directly to the supply-voltage $V_{DD}$. The dependent current circuit 456 may comprise one or more transistors M5 having a gate controlled by current that has a magnitude depending on a voltage across a transistor M4 coupled to the supply voltage $V_{DD}$. This is because the dependent current is a function of Vsg_M5 (voltage source-to-gate). In this case, Vg=0, Vs=$V_{DD}$–Vsd_M4 (voltage source-to-drain), and therefore, the dependent current is a function of $V_{DD}$.

In some embodiments, the integrated circuit chip 240 may comprise one or more transistors M6b configured to bound a reference voltage coupled to a comparison of the current substantially dependent on the supply voltage $V_{DD}$ and the current substantially independent of the supply voltage $V_{DD}$. That is, M6b operates to ensure that when $V_{DD}$ is low, the node $V_{DD}$_REF is not floating, so that the result is not unpredictable.

The output circuit 458 may comprise a logic function circuit 368 to receive the comparison of the current substantially dependent on the supply voltage $V_{DD}$ and the current substantially independent of the supply voltage $V_{DD}$. For example, the logic function circuit 368 may comprise a pair of serially-connected Schmitt triggers 476, 478.

The integrated circuit chip 240 may also comprise a first transistor M12 and a second transistor M11, wherein the first transistor M12 is in a first state (e.g., an ON state) when the supply voltage $V_{DD}$ is less than a power-on selected value. The first transistor M12 may be configured to enter a second state (e.g., the OFF state) when the supply voltage $V_{DD}$ is greater than the power-on selected value to permit charging a capacitor C1 using current through the second transistor M11, so that the power-on reset indication POR_OUT is asserted responsive to the charging.

Several additional embodiments may be realized. For example, the output circuit 458 may comprise a capacitor C1 to charge when a supply voltage $V_{DD}$ increases, and not when the supply voltage $V_{DD}$ decreases. The capacitor C1 may be coupled to a pair of Schmitt triggers 476, 478, and the power-on reset indication POR_OUT may comprise one or more pulses 484.

The output circuit 458 may comprise a logic gate 480 to combine a comparison result COMP_B of the current substantially dependent on the supply voltage and the current substantially independent of the supply voltage, and a delayed version of the comparison result COMP_DE-LAYED. The current substantially independent of the supply voltage $V_{DD}$ may comprise a transistor bias current (e.g., the bias current of transistor M10).

FIG. 5 is a top view of the components of a Radio Frequency IDentification (RFID) tag 520, including a tag that can be used in conjunction with the circuit of FIG. 2, according to various embodiments of the invention. While tag 520, as shown, is implemented as a passive tag, meaning it does not have its own power source, much of what is described in this document applies also to active tags.

Tag 520 is formed on a substantially planar inlay 522, which can be made in many ways known in the art. Tag 520 includes an electrical circuit 540, which is preferably implemented in an integrated circuit (IC) 540, and may be similar to or identical to the integrated circuit 240 of FIG. 2. IC 540 is arranged on and supported by the inlay 522, and typically includes RFID circuitry.

Tag 520 also includes an antenna for exchanging wireless signals with its environment. The antenna is usually flat and attached to inlay 522. IC 540 is electrically coupled to the antenna via suitable antenna ports (not shown).

The antenna may be made in a number of ways, as is well known in the art. In the example of FIG. 5, the antenna is made from two distinct antenna segments 527, which are shown here forming a dipole. Many other embodiments are possible, using any number of antenna segments. For example, in some embodiments, an antenna can be made with even a single segment 527. Different locations on the segment can be coupled to one or more of the antenna ports of IC 540. For example, the antenna can form a single loop, with its ends coupled to the ports. When the single segment has more complex shapes, it should be remembered that, at the frequencies of RFID wireless communication, even a single segment can behave as if it is constructed from multiple segments. In the embodiment of FIG. 5, the antenna segments 527 are separate from IC 540. In other embodiments, the antenna segments 527 may be formed on IC 540.

In operation, a signal is received by the antenna, and communicated to IC 540, where the included RFID circuitry both harvests power, and responds if appropriate, based on the incoming signal and its internal state. In order to respond by replying, IC 540 modulates the reflectance of the antenna, which generates the backscatter from a wave transmitted by an RFID reader. Coupling together and uncoupling the antenna ports of IC 540 can modulate the reflectance, as can a variety of other means.

As is well known in the art, integrated circuits such as IC 540 that include RFID circuitry may be divided functionally and/or physically into several parts or sections. These sections may include one or more antenna sections (described above), signal routing or switching sections, power management sections, radio sections, logical sections, processing circuitry sections, and memory sections. Indeed, in some such devices, the memory section may constitute the largest part.

Power management units (PMUs) or power management sections may be implemented in any way known in the art, and can be used for harvesting raw RF power received via the antenna, whether or not the received waveform is modulated. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

Many RFID devices include a demodulator to demodulate an RF signal received via the antenna. The demodulator may be implemented in any way known in the art, including an attenuator stage, amplifier stage, and so on.

RFID devices may also include a processing block or processing circuitry to receive the demodulated signal from the demodulator, and to perform a variety of operations, including logical operations, as well as operating to generate an output signal for transmission. The processing block may be implemented in any way known in the art. For example, the processing block may include a number of components, such as a processor, a memory, a decoder, an encoder, and so on.

Finally, RFID devices may include a modulator to modulate an output signal generated by the processing block. The modulated signal is transmitted by driving antenna connections, and therefore by driving the load presented by the coupled antenna segment(s). The modulator may be implemented in any way known in the art, including a driver stage, an amplifier stage, and so on. In some embodiments, the demodulator and modulator are combined in a single transceiver circuit. The modulator may include a backscatter transmitter or an active transmitter. The demodulator and modulator may be formed as part of the processing block.

It will be recognized at this juncture that the circuit elements just described may form part of an RFID reader device. In this case, no power management unit is typically needed. Indeed, an RFID reader can typically be powered differently, such as from a wall outlet, a battery, and so on. Additionally, when configured to operate in conjunction with an RFID reader, the processing block may have additional Inputs/Output (I/O) ports to couple to a terminal, network, and other such devices or connections.

The IC 540 can include any one or more of the components described with respect to an RFID circuit. One or more of the sections described, and/or any of their components, may operate as the receiving circuitry 244 shown in FIG. 2. RFID circuits, as is well known in the art, may include additional components with respect to those that have been described, as well as different components, depending on the desired implementation. Readers of this document that desire to know more about the fundamentals of RFID circuit structure and function are therefore encouraged to consult U.S. Patent Publication No. 2005/0270189, assigned to the assignee of the disclosed embodiments, and incorporated herein by reference in its entirety.

Thus, many additional embodiments may be realized. For example, referring now to FIGS. 2-5, it can be seen that an RFID tag 520 may comprise an inlay 522, an antenna structure 527 supported by the inlay 522, and a processing circuit (not explicitly shown in FIG. 5, but included in the IC 540) coupled to the antenna structure 527. The tag 520 may include a power-on reset circuit 252, as described above, coupled to the processing circuit (which operates as the receiving circuit 244).

Various embodiments of the invention include methods. An economy is achieved in the present document in that a single set of flowcharts is used to describe methods in and of themselves, along with operations of hardware and/or software. This is regardless of how each element is implemented. Several methods are now described more particularly according to various embodiments.

Figure 6:
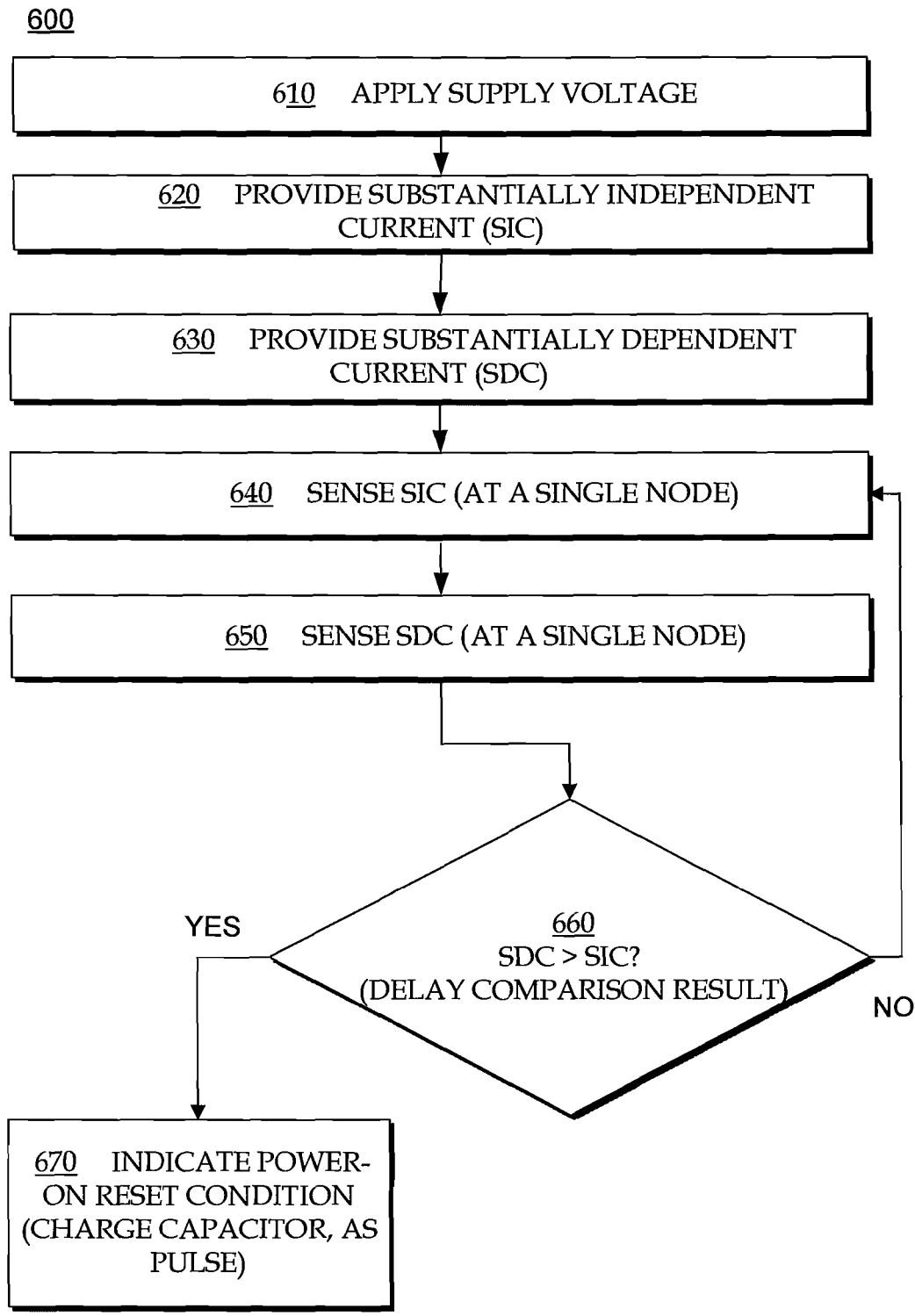
FIG. 6 is a flowchart illustrating methods of operating a power-on reset circuit according to various embodiments of the invention.

FIG. 6 is a flowchart illustrating methods 600 of operating a power-on reset circuit according to various embodiments of the invention. Thus, it can be seen that in some embodiments a method 600 may begin at block 610 with applying a supply voltage to a power-on reset circuit coupled to a receiving circuit, such as the processing circuit of an RFID tag. The method 600 may go on to include providing a first current substantially independent of the supply voltage at block 620, and providing a second current substantially dependent on the supply voltage at block 630. The current substantially independent of the supply voltage may be provided as a bias current, as noted previously.

In most embodiments, the method 600 includes sensing the first current at block 640, and sensing the second current at block 650. In some embodiments, this may include sensing the current substantially independent of the supply voltage and the current substantially dependent on the supply voltage at a single node, such as a node comprising a Schmitt trigger input.

The method 600 may include comparing the first and second currents at block 660. For example, the comparison activity may include delaying a comparison result of the current substantially independent of the supply voltage and the current substantially dependent on the supply voltage to provide a delayed comparison, and providing the comparison result and the delayed comparison to inputs of a logic gate (e.g., an AND gate). Delaying the comparison result may include charging a capacitor coupled to a pair of Schmitt triggers, as described previously.

If the comparison results in a determination that the power supply voltage has risen to a sufficient level, then the method 600 may go on to include indicating a power-on reset condition based on the comparison between the first current and the second current at block 670. Otherwise, the method 600 may return to sensing the currents at blocks 640 and 650.

Assuming that the comparison between the currents indicates a sufficient level of supply voltage, the method 600 may comprise, responsive to comparing the values of a comparison result and a delayed comparison result, providing the indication of the power-on reset condition as a pulse at an output of a logic gate. The pulse may be formed in some cases by turning a first transistor to a first state (e.g., ON) when the supply voltage is less than a power-on selected value, turning off the first transistor when the supply voltage is greater than the power-on selected value to permit charging a capacitor by current through a second transistor, and terminating the power-on reset pulse responsive to the charging.

The electrical circuits described in this document can be manufactured in any number of ways, as will be appreciated by persons of ordinary skill in the art. One such way is in the form of one or more integrated circuits (e.g., IC 540 of FIG. 5).

Schematic-type inputs can be provided for the purpose of preparing one or more layouts. These inputs can include only the schematic of a circuit, or much more information, such as the relative sizes of circuit components, and the like, as may be appreciated by those of ordinary skill in the art of providing such inputs. These inputs can be provided in any suitable way, such as using a written document, or electronically, as computer files and the like. Some of these computer files can be prepared with the assistance of suitable design tools, which often include instrumentalities for simulating circuit behaviors and the like.

These inputs can be provided to a person of ordinary skill in the art of preparing layouts. This may occur whether the person is within the same company, or another company, such as under a contract. A layout can be prepared that embodies the schematic-type inputs by one of ordinary skill in the art. The layout itself may be prepared as a computer file, so that it can easily be checked for errors, modified as needed, and so on.

Layout computer files can be made to form portions of larger layout computer files. For example, suitable individual designs can be assembled for the electrical components and circuits indicated in the schematic-type inputs. The individual designs can be generated anew, or selected from existing libraries. In the layout phase, the assembled designs can be arranged to interoperate, so as to implement one or more integrated circuits comprising the electrical circuits of the provided schematic-type inputs. These computer files can be stored in storage media, such as memories, whether portable or not, and the like.

Then a special type of computer file can be synthesized from the prepared layout, in a manner that incorporates the prepared layout, which has the embodied schematic-type inputs. Such files are known in the industry as IC chip design files or tapeout files, and these embody instructions for machinery directing how to process a semiconductor wafer so as to produce an integrated circuit that is arranged as in the incorporated layout.

The synthesized tapeout file may be transferred to a semiconductor manufacturing plant, which is also known as a foundry, and so on. Transferring can occur using any suitable means, such as over an electronic network. Tapeout files can also be recorded in a storage medium, which in turn is physically shipped to the mask manufacturer.

The received tapeout file may be used by mask making machinery as instructions for processing a semiconductor wafer. The wafer, as thus processed, now has one or more integrated circuits, each made according to the layout incorporated in the tapeout file. If more than one integrated circuit is included in the wafer, then the wafer can be diced to separate them, and so on.

Thus, additional embodiments may be realized. For example, a method may comprise providing schematic-type inputs for the purpose of preparing a layout that embodies the schematic-type inputs, in which, if the layout is incorporated in a tapeout file that is used by mask making machinery as instructions for processing a semiconductor wafer, one or more integrated circuits will result on the wafer according to the schematic-type inputs.

The integrated circuits resulting on the wafer may each comprise any one or more of the component elements described with respect to the integrated circuit chips 240 and 540 of FIGS. 2 and 5, respectively, as well as the circuits illustrated in FIGS. 3-4. In some embodiments, the method may comprise preparing the layout that embodies the provided schematic type inputs, synthesizing a tapeout file that incorporates the prepared layout to provide a synthesized tapeout file, and operating mask making machinery according to the synthesized tapeout file.

It should be noted that the methods described herein can be implemented in any number of ways, including via the structures described in this document. One such way is by machine operations, using devices of the type described in this document. Another optional way is for one or more of the individual operations of the methods to be performed in conjunction with one or more human operators performing others. These human operators need not be collocated with each other, but each may be located separately, along with one or more machines that perform a portion of the operations described.

In addition, it should be noted that the methods described herein do not have to be executed in the order described, or in any particular order. Moreover, various activities described with respect to the methods identified herein can be executed in iterative, repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment.

Thus, other embodiments may be realized. For example, an article of manufacture, such as a computer, a memory system, a magnetic or optical disk, some other storage device, an RFID reader, an RFID tag, and/or any type of electronic device or system may include a processor coupled to a machine-accessible medium such as a memory (e.g., removable storage media, as well as any memory including an electrical, optical, or electromagnetic conductor) having associated information (e.g., computer program instructions and/or data), which when accessed, results in a machine (e.g., the processor) performing any of the actions described with respect to the methods above.

Thus, in some embodiments, an article may comprise a machine-readable memory containing thereon instructions which, if executed by mask making machinery as instructions for processing a semiconductor wafer, result in an integrated circuit on the wafer. The integrated circuits resulting on the wafer may each comprise any one or more of the component elements described with respect to the integrated circuit chips 240 and 540 of FIGS. 2 and 5, respectively, as well as the circuits illustrated in FIGS. 3-4.

Implementing the circuits and methods disclosed herein may provide an improved power-on reset circuit mechanism that can be used with a variety of receiving circuits, such as memories, processors, and RFID devices. The scalability and portability of the various embodiments to different and more advanced technologies, such as when $V_{DD}$ is scaled down or the foundry is changed, can provide more reliable operation, improving overall system performance.

The accompanying drawings that form a part hereof, show by way of illustration, and not of limitation, specific embodiments in which the subject matter may be practiced. The architecture of the system is presented for purposes of explanation, and not of limitation. Its particular subdivision into modules need not be followed for creating embodiments according to the invention. Furthermore, the features of the invention can be performed either within a single one of the modules, or by a combination of them.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In this description, numerous specific details such as logic implementations, opcodes, means to specify operands, resource partitioning, sharing, and duplication implementations, types and interrelationships of system components, and logic partitioning/integration choices are set forth in order to provide a more thorough understanding of various embodiments. It will be appreciated, however, by those of ordinary skill in the art that embodiments of the invention may be practiced without such specific details. In other instances, control structures, gate level circuits, and full software instruction sequences have not been shown in detail so as not to obscure the embodiments of the invention.

The logic level values of LOW and HIGH noted herein may be realized by supply and reference voltage levels of VDD and VSS, respectively. Thus, for example, in some embodiments, a LOW logic level may be approximately 0 volts, and a HIGH logic level may be approximately 3.3 volts. The absolute voltage levels may be different, or even reversed in many embodiments (e.g., a LOW logic level is +1.0 volts, and a HIGH logic level is −2.2 volts).

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An integrated circuit chip, comprising:
   an independent current circuit to provide a current substantially independent of a supply voltage;
   a dependent current circuit to provide a current substantially dependent on the supply voltage; and
   an output circuit to provide a power-on reset indication based on a comparison between the current substantially dependent on the supply voltage and the current substantially independent of the supply voltage.

2. The integrated circuit chip of claim 1, wherein the independent current circuit comprises:
   a transistor coupled directly to the supply-voltage.

3. The integrated circuit chip of claim 1, wherein the dependent current circuit comprises:
   a transistor having a gate controlled by current that has a magnitude depending on a voltage across a transistor coupled to the supply voltage.

4. The integrated circuit chip of claim 3, wherein the voltage across the transistor comprises:
   a source to drain voltage.

5. The integrated circuit chip of claim 1, comprising:
   a transistor configured to bound a reference voltage coupled to a comparison of the current substantially dependent on the supply voltage and the current substantially independent of the supply voltage.

6. The integrated circuit chip of claim 1, wherein the output circuit comprises:
   a logic function circuit to receive the comparison of the current substantially dependent on the supply voltage and the current substantially independent of the supply voltage.

7. The integrated circuit chip of claim 6, wherein the logic function circuit comprises:
   a pair of serially-connected Schmitt triggers.

8. The integrated circuit chip of claim 1, comprising:
   a first transistor and a second transistor, wherein the first transistor is in a first state when the supply voltage is less than a power-on selected value, wherein the first transistor is in a second state when the supply voltage is greater than the power-on selected value to permit charging a capacitor using current through the second transistor, and wherein the power-on reset indication is asserted responsive to the charging.

9. An article comprising a machine-readable memory containing thereon instructions which, if executed by mask making machinery as instructions for processing a semiconductor wafer, an integrated circuit will result on the wafer, comprising:
   an independent current circuit to provide a current substantially independent of a supply voltage;
   a dependent current circuit to provide a current substantially dependent on the supply voltage; and
   an output circuit to provide a power-on reset indication based on a comparison between the current substantially dependent on the supply voltage and the current substantially independent of the supply voltage.

10. The article of claim 9, in which the independent current circuit comprises:
    a transistor coupled directly to the supply-voltage.

11. The article of claim 9, in which the dependent current circuit comprises:
    a transistor having a gate controlled by current that has a magnitude depending on a voltage across a transistor coupled to the supply voltage.

12. The article of claim 9, wherein the voltage across the transistor comprises:
    a source to drain voltage.

13. The article of claim 9, in which the integrated circuit further comprises:
    a transistor configured to bound a reference voltage coupled to a comparison of the current substantially dependent on the supply voltage and the current substantially independent of the supply voltage.

14. The article of claim 9, in which the output circuit comprises:
    a logic function circuit to receive the comparison of the current substantially dependent on the supply voltage and the current substantially independent of the supply voltage.

15. The article of claim 9, in which the logic function circuit comprises:
    a pair of serially-connected Schmitt triggers.

16. The article of claim 9, in which the integrated circuit further comprises:
    a first transistor and a second transistor, wherein the first transistor is in a first state when the supply voltage is less than a power-on selected value, wherein the first transistor is in a second state when the supply voltage is greater than the power-on selected value to permit charging a capacitor using current through a second transistor, and wherein the power-on reset indication is asserted responsive to the charging.

* * * * *